United States Patent

Kupper et al.

[11] Patent Number: 5,219,544
[45] Date of Patent: Jun. 15, 1993

[54] METHOD OF PURIFYING THE EXHAUST GASES FROM PLANTS FOR THE PRODUCTION OF CEMENT CLINKER

[75] Inventors: Detlev Kupper, Telgte; Ludger Brentrup; Wolfgang Rother, both of Oelde, all of Fed. Rep. of Germany

[73] Assignee: Krupp Polysius AG, Fed. Rep. of Germany

[21] Appl. No.: 631,159

[22] Filed: Dec. 20, 1990

[30] Foreign Application Priority Data

Jan. 12, 1990 [DE] Fed. Rep. of Germany ....... 4000795

[51] Int. Cl.$^5$ .......................... B01J 8/00; C01B 21/00; C01B 17/00; C01C 3/00
[52] U.S. Cl. .................................... 423/239; 423/210; 423/237; 423/244.01; 106/761
[58] Field of Search ............... 423/244 A, 244 R, 239, 423/239 A, 210, 237; 106/761

[56] References Cited

U.S. PATENT DOCUMENTS 4,910,005 3/1990 Heins et al. ........................ 423/239
4,919,905 4/1990 Horaguchi et al. ................ 423/239

FOREIGN PATENT DOCUMENTS 249854 9/1987 German Democratic Rep. ..................... 423/239

Primary Examiner—Gregory A. Heller
Attorney, Agent, or Firm—Learman & McCulloch

[57] ABSTRACT

The invention relates to a method of purifying the exhaust gases from plants for the production of cement clinker, in which the filter zone through which the exhaust gases flow contains at least one adsorption stage in which an adsorbent is provided which is suitable for fixing $NH_x$ compounds, heavy metals and/or trace pollutants, at least a proportion of the adsorbent being removed from the adsorption stage at specific intervals of time and introduced into the final burning zone and-/or preheating zone. By such a method the $NO_x$ content of the exhaust gases is significantly reduced, and at the same time heavy metals and trace pollutants are eliminated from the exhaust gases.

20 Claims, 3 Drawing Sheets

METHOD OF PURIFYING THE EXHAUST GASES FROM PLANTS FOR THE PRODUCTION OF CEMENT CLINKER

TECHNICAL FIELD

The invention relates to a method for purifying the exhaust gases from plants for the production of cement clinker, and also to a plant for the production of cement clinker.

BACKGROUND

In the production of cement clinker the exhaust gases from the final burning zone (generally formed by a rotary kiln) usually contain a greater or lesser proportion of nitrogen oxides (so-called $NO_x$ content). These nitrogen oxides are formed partly by reaction of oxygen with the nitrogen in the combustion air and partly by oxidation of the nitrogen compounds in the fuel (cf. "Zement-Kalk-Gips" 37/1984, p. 499-507).

The $NO_x$ content of the exhaust gases is undesirable because of the emission problems which it causes. Therefore various methods have already been developed in order to reduce the $NO_x$ content of the exhaust gases.

Thus it is known in precalcination processes to produce a reducing atmosphere in the precalcination zone outside the rotary kiln by sub-stoichiometric combustion of fuel ("ICS proceedings" 1979, p. 45, FIG. 6). In this case the calcination of the preheated material is carried out in two stages: The first stage is operated with exhaust air from the cooling zone with an oxygen deficiency so that a CO-containing gas mixture from this precalcination zone enters the kiln exhaust gas duct. In this kiln exhaust gas duct a reducing atmosphere is first of all created in which a proportion of the $NO_x$ is reduced to nitrogen. In the adjoining part of the kiln exhaust gas duct combustion conditions are created by introducing a further proportion of exhaust air from the cooler so that the residual burn-out of the fuel takes place.

DE-A-35 22 883 also describes a process in which additional fuel is introduced into the exhaust gases from the rotary kiln outside the rotary kiln before the exhaust gases enter the precalcination zone, the quantity of this additional fuel and the oxygen content of the exhaust gases from the burning zone being such that a substoichiometric combustion in the exhaust gases from the burning zone takes place in the zone before the entry of the exhaust gases into the precalcination zone.

DE-A-39 25 475.5 also relates to a process in which a proportion of the fuel used for the entire heat treatment for the purpose of producing a reducing atmosphere and at least one fortifying reagent which promotes the effect of this reducing atmosphere on the $NO_x$ reduction are introduced into the material feed zone of the rotary kiln.

The exhaust gases from plants for the production of cement clinker frequently contain in addition to the $NO_x$ discussed above $NH_3$, $SO_x$, HCL as well as heavy metals and trace pollutants which can lead to emission problems. Until now there has been no method available which is both effective and economic for the removal of these pollutants.

The object of the invention, therefore, is to develop a method and a plant which make it possible using very effective and at the same time economic means to produce a marked reduction in the $NO_x$ content of the exhaust gases and at the same time to purify the exhaust gases of troublesome heavy metals and trace pollutants.

SUMMARY OF INVENTION AND ADVANTAGES

In the method according to the invention the filter zone which serves for purification of the exhaust gases contains at least one adsorption stage in which an adsorbent is provided which is suitable for fixing $NH_x$ compounds, heavy metals, trace pollutants and/or $SO_2$ contained in the exhaust gases (the $NH_x$ compounds are present in the exhaust gases from a clinker burning plant either in the form of aerosols or of gas constituents). According to the invention at least a proportion of this adsorbent charged with $NH_x$ compounds, heavy metals and trace pollutants (and additionally—as will be explained—usually with $SO_2$ and $H_2O$) is removed from the adsorption stage at specific intervals of time or at a specific charge and at least a proportion is introduced into the final burning zone, calcination zone and/or preheating zone.

The $SO_x$ charge on the adsorbent and/or the pressure loss at least of one adsorption layer can also be adduced as a determining factor for the removal of the absorbent.

In the burning process for the production of clinker the $NH_x$ compounds taken up on the adsorbent are released again and contribute significantly to the reduction of the $NO_x$ compounds resulting from the clinker burning process. In this way a marked $NO_x$ reduction is already achieved during the clinker buring process, so that the denitration capacity to be provided in the filter zone is reduced.

The heavy metals and/or trace pollutants taken up on the adsorbent are most thoroughly fixed in the clinker during introduction of the adsorbent into the clinker burning process and in this way are effectively removed from the exhaust gases from the cement clinker burning plant.

In the method according to the invention the filter zone contains at least the following filter stages through which exhaust gases which have been most thoroughly cleaned of dust flow in succession:

an adsorption stage which serves for fixing $NH_x$ compounds, heavy metals and trace pollutants as well as $SO_2$, and a further adsorption stage which serves for at least partial reduction of $NO_x$ compounds.

Between the two last-mentioned adsorption stages a gas containing $NH_3$ is advantageously introduced into the exhaust gas stream to be purified.

The adsorption stage which serves for fixing $NH_x$ compounds, heavy metals and trace pollutants as well as $SO_2$ and water vapour can have at least two adsorption chamber which are arranged in series and through which exhaust gas flows in succession, and preferably adsorbent from the first adsorption chamber is introduced into the final burning zone, calcination zone and-/or preheating zone.

In the first adsorption chamber sulphur oxides ($SO_2$) are taken up at least partially by adsorption on the adsorbent. Then in the second adsorption chamber the sulphur oxides leaving the first adsorption chamber with the gas stream are completely or almost completely adsorbed on the adsorbent located in the second adsorption chamber.

In the adsorption stage which follows this, the nitrogen oxides ($NO_x$ compounds) present in the gas stream are at least partially reduced catalytically with a gas containing $NH_3$ on the adsorbent which is located in this adsorption stage. Nitrogen and water vapour are predominantly produced in this case.

At least a proportion of the adsorbent charged with $NH_x$ compounds and $SO_2$ from the adsorption stage intended for fixing $NH_x$ compounds can advantageously be introduced into the adsorption stage which serves for reducing $NO_x$ compounds. In this way, in the last-mentioned adsorption stage excess or penetrating $NH_3$ is fixed by means of $SO_2$-containing adsorbent from the preceding adsorption stage.

A carbonaceous material, e.g. activated charcoal, can be used as adsorbent. Since this material also possesses a calorific value it acts simultaneously as fuel when introduced into the clinker burning process.

Furthermore, with the use of a carbonaceous adsorbent hydrocarbon compounds contained in the exhaust gases and/or odour-forming gas constituents are at least partially retained by the adsorbent, and these hydrocarbon compounds and/or odour-forming constituents are oxidised when the adsorbent charged therewith is introduced into the clinker burning process.

A zeolite (i.e. an aluminium-containing silicate) has also proved suitable as adsorbent.

Nitrogen-containing materials, preferably lime-nitrogen compounds, can also be used advantageously as adsorbent within the framework of the method according to the invention.

The quantity of adsorbent charged with $NH_x$ compounds, heavy metals and $SO_2$ introduced into the final burning zone, the calcination zone and/or the preheating zone is advantageously altered depending upon the Cl and/or $SO_3$ content of the material, and this pollutant content of the material is preferably measured at the point of intersection between the preheating or precalcination zone and the final burning zone. The alteration in the quantity of the adsorbent introduced into the clinker burning process can take the form of control or regulation.

The quantity of adsorbent which is removed from the absorption stage serving for fixing $NH_x$ compounds and/or heavy metals, as well as the time at which this removal occurs, are advantageously determined by measuring the concentration of at least one exhaust gas component, preferably after this adsorption stage. Here too, alterations can be carried out in the form of simple control or automatic regulation.

In addition, the pressure loss in this adsorption chamber or the charge of the adsorbent with a gas constituent can be adduced as a control value.

The water content of the exhaust gas before entry into the adsorption stage serving for binding in of $NH_x$ compounds, heavy metals and $SO_2$ is set by admixture of fresh air to a suitable value, preferably to below 12% by volume.

The temperature of the exhaust gas before entry into the adsorption stage serving for fixing of $NH_x$ compounds, heavy metals and $SO_2$ is set by admixture of fresh air preferably to a value between 50° and 200° C.

In view of the direct operation or interconnected operation which are the usual alternatives in cement works (in the latter the exhaust gases are first delivered to a dryer-crusher before they reach the electrostatic filter), the properties of the exhaust gases are adapted by admixture of fresh air to the requirements of the adsorption so that similar intake conditions for the filter zone occur in both modes of operation.

If, as is usual, a final burning zone (usually a rotary kiln) which is heated from the material discharge side is used, then according to the invention at least a proportion of the adsorbent removed from the adsorption stage can be introduced from the material discharge side into the final burning zone.

Furthermore, when a final burning zone is used which is heated from the material discharge side, in addition to the adsorbent a carbonaceous reducing agent can be introduced into the material inlet region of the final burning zone, e.g. via a kiln inlet burner. In this way a reducing atmosphere is created in the material inlet region of the final burning zone (i.e. in the case of a rotary kiln in the material feed zone thereof), as a result of which the $NO_x$-reducing effect of the adsorbent is enhanced.

The purification method according to the invention also permits the far-reaching use of secondary fuels, in which case the emission of pollutants, particularly of halogenated organic compounds such as dioxins and furans, can be reduced by up to two powers of ten by comparison with known methods.

Because of the special operational conditions in the burning of cement clinker (particularly because of the high temperatures and relatively long residence times at these high temperatures), it has already long been the practice to a certain extent to replace a proportion of the fuel normally used for the cement production (such as coal, oil or gas) by so-called secondary fuels. These secondary fuels are for example old tires, acid sludge, fuller's earth, fuel from refuse, gas from refuse tips, pyrolysis gas, solvent residues, PCB-contaminated used oil, sludge, wood chippings and/or fruit peelings.

In spite of the aforementioned special process conditions in cement production, however, measurements have shown that it is still frequently possible (for example in the case of combustion of used oils containing PCBs) for measurable emissions of dioxins and furans as well as other partially chlorinated compounds to occur. Because of the particular toxicity of these substances and bearing in mind that these compounds are not or are only to a limited extent biodegradable and thus accumulate in the environment, such emissions of pollutants are very hazardous.

In the past, for many secondary fuels it was only the principal firing which came into consideration because of their frequently high thermal stability, since only in this way could the necessary high temperatures of more than 1200° C. and gas residence times of more than 2 s be achieved. However, for combustion engineering reasons it is a regular prerequisite of the use of secondary fuels in the principal firing of a rotary kiln plant that the secondary fuels be pretreated (e.g. crushed or homogenised), which is very costly.

In the application of the purification method according to the invention, secondary fuels which constitute thermally comparatively stable compounds can also be burnt in the precalcination zone (i.e. in the part of the preheating zone which serves for deacidification of the raw material or in a simple manner in the region of the final burning zone on the material inlet side, i.e. introduced into the inlet of the rotary kiln. Any cracking products resulting from this as well as the gaseous products which are not yet fully oxidised are adsorbed in the filter zone according to the invention which has already been described in detail above.

For the economic operation of the method it is of great importance that the adsorption agents are either suitable for cement production because of their chemical composition or that for example the carbon content of the adsorption agents can contribute a proportion of the thermal energy necessary for the cement production.

The charged adsorption agent is withdrawn from the adsorption stage either periodically or continuously and replaced by fresh material. The charged adsorption agent is—in the case where it is a combustible material— preferably introduced into the high temperature zone of the rotary kiln by delivery via the main burner. Even in the case of non-combustible substances it is recommended to return them to the final burning zone, i.e. the rotary kiln, since in this way the adsorbed organic pollutants are subjected a second time to heat treatment and thus degraded as thoroughly as possible.

Apart from organic constituents such as dioxins, furans and other halogenated or non-halogenated hydrocarbons, other pollutants which are environmentally relevant, such as for instance easily vaporisable heavy metal compounds, can be precipitated with the adsorption stage according to the invention. In the case of mercury, thallium or cadmium it is necessary to create an appropriate trough in order to avoid accumulations in circulation systems. This can be achieved by installation of a gas bypass. A second possibility consists of rejecting a proportion of the electrostatic filter dust (dumping on a refuse tip or intergrinding into the cement). In the case of intergrinding into the cement the heavy metals contained in the filter dust are are finally fixed the concrete so as to be environmentally neutral.

BRIEF DESCRIPTION OF THE DRAWINGS

Some embodiments of plants for carrying out the method according to the invention are illustrated in the drawings, in which.

DETAILED DESCRIPTION OF THE PREFERRED EMBODIMENTS

Figure 1:
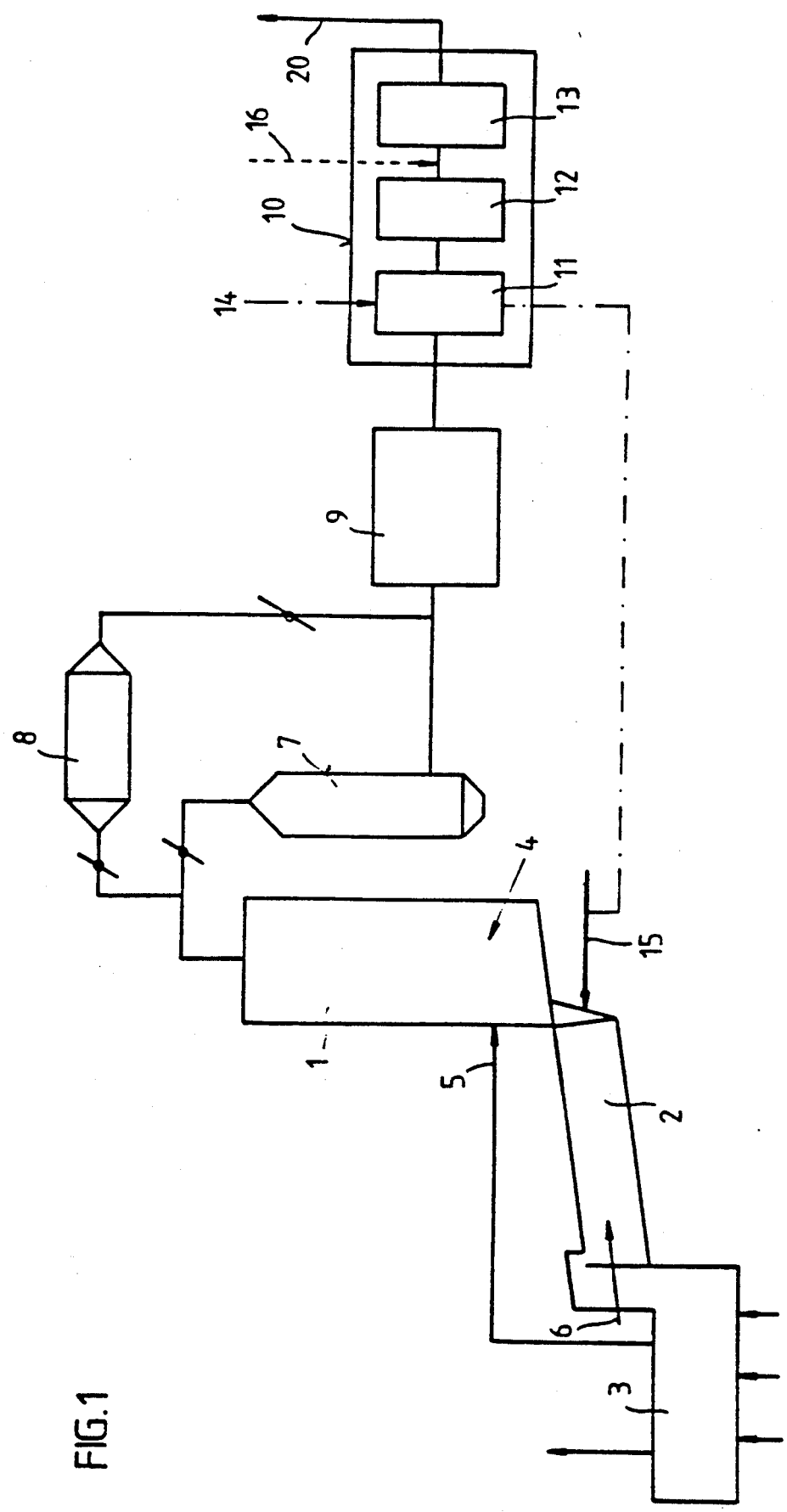
FIG. 1 shows a schematic representation of a plant according to the invention for the production of cement clinker.

The plant for the production of cement clinker which is illustrated schematically in FIG. 1 contains a preheater 1 which serves for preheating and at least partial deacidification of the raw material, a rotary kiln 2 which serves for final burning of the preheated and deacidified material and a cooler 3. In a known manner the preheater 1 can contain in its lower region a precalcination zone which is supplied with additional fuel (arrow 4) and exhaust air from the cooler 3 (arrow 5) for thorough deacidification of the preheated material.

The rotary kiln 2 is heated in the usual way from the material discharge side (arrow 6). The exhaust gases from the rotary kiln 2 pass through the preheater and then pass either to a cooling tower 7 or to a raw grinding mill 8 which serves for drying and grinding the raw material.

After passing through the cooling tower 7 or the raw grinding mill 8 the exhaust gases are cleaned of dust, e.g. in an electrostatic filter 9, and then pass into the next filter 10.

The filter 10 contains three adsorption chambers 11, 12 and 13 which are constructed as granular bed reactors and the exhaust gases pass through these chambers in succession. An adsorbent 14, which after a certain charge with $NH_x$ compounds, heavy metals, trace pollutants and $SO_2$ is at least partially discharged from the adsorption chamber 11 and delivered to the material inlet region of the rotary kiln 2 (arrow 15), is delivered at least to the first adsorption chamber 11.

Between the adsorption chambers 12 and 13 (which can also contain the said filter medium) $NH_3$ can be added (arrow 16) so that in the adsorption chamber 13 a reduction in the $NO_x$ compounds still contained in the gas stream takes place by means of the gas containing $NH_3$, the adsorbent in this case having a catalytic action.

Figure 2:
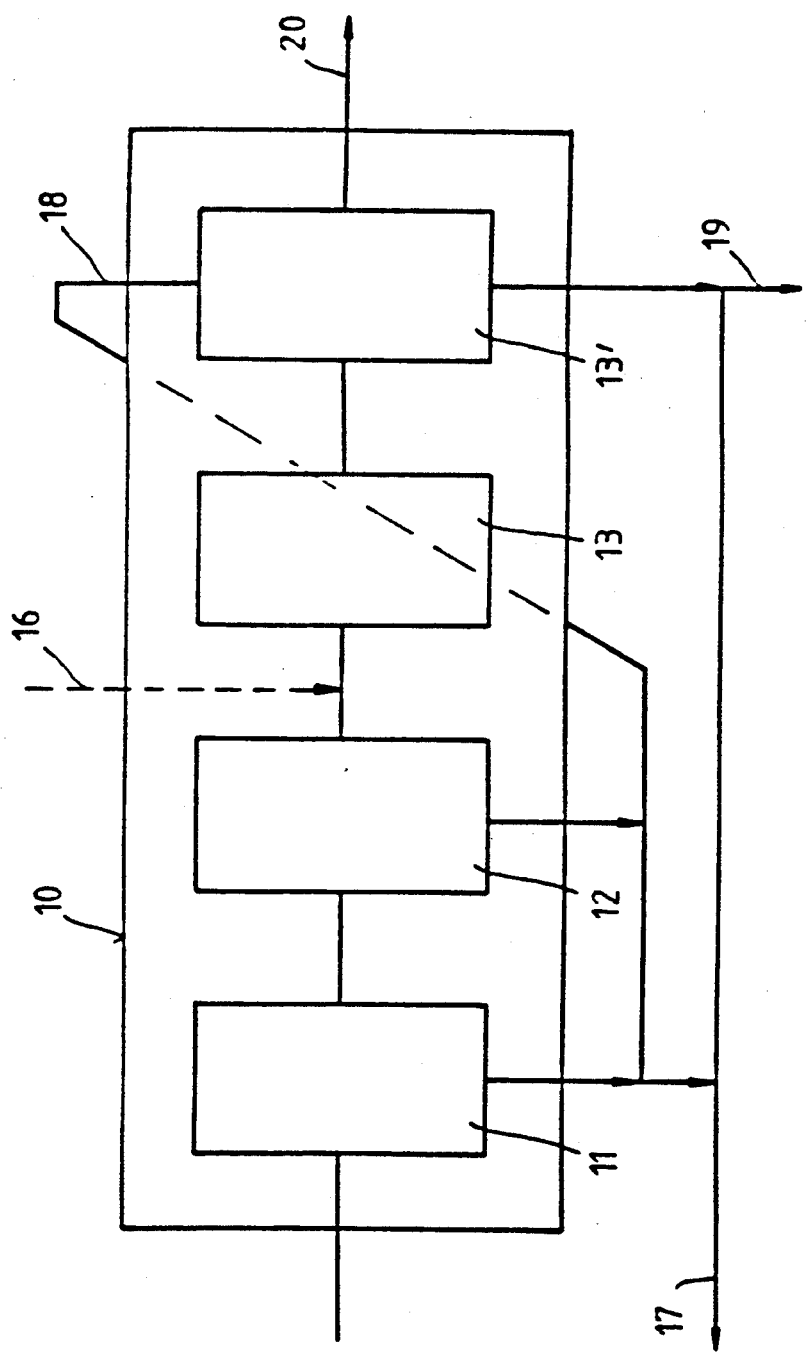
FIGS. 2 and 3 show variants of the filter zone.

FIG. 2 shows a variant of the filter 10. In this case four adsorption chambers 11, 12, 13 and 13' are provided, and the $NH_3$ 16 is delivered between the adsorption chambers 12 and 13.

Some of the adsorbent discharged from the adsorption chambers 11 and/or 12 is passed to the rotary kiln 2 (arrow 17). A further proportion of this adsorbent discharged from the adsorption chambers 11 and 12 can be delivered to the last adsorption chamber 13' (arrow 18) in order to bind in excess or penetrating $NH_3$ here. Adsorbent discharged from the adsorption chamber 13' can either be passed—at least partially—to the rotary kiln 2 (arrow 17), to a refuse tip (arrow 19) or used elsewhere.

The purified exhaust gases leaving the filter 10 reach the chimney (arrow 20).

It goes without saying that the number of chambers in the filter 10 can also be further increased if required.

Figure 3:
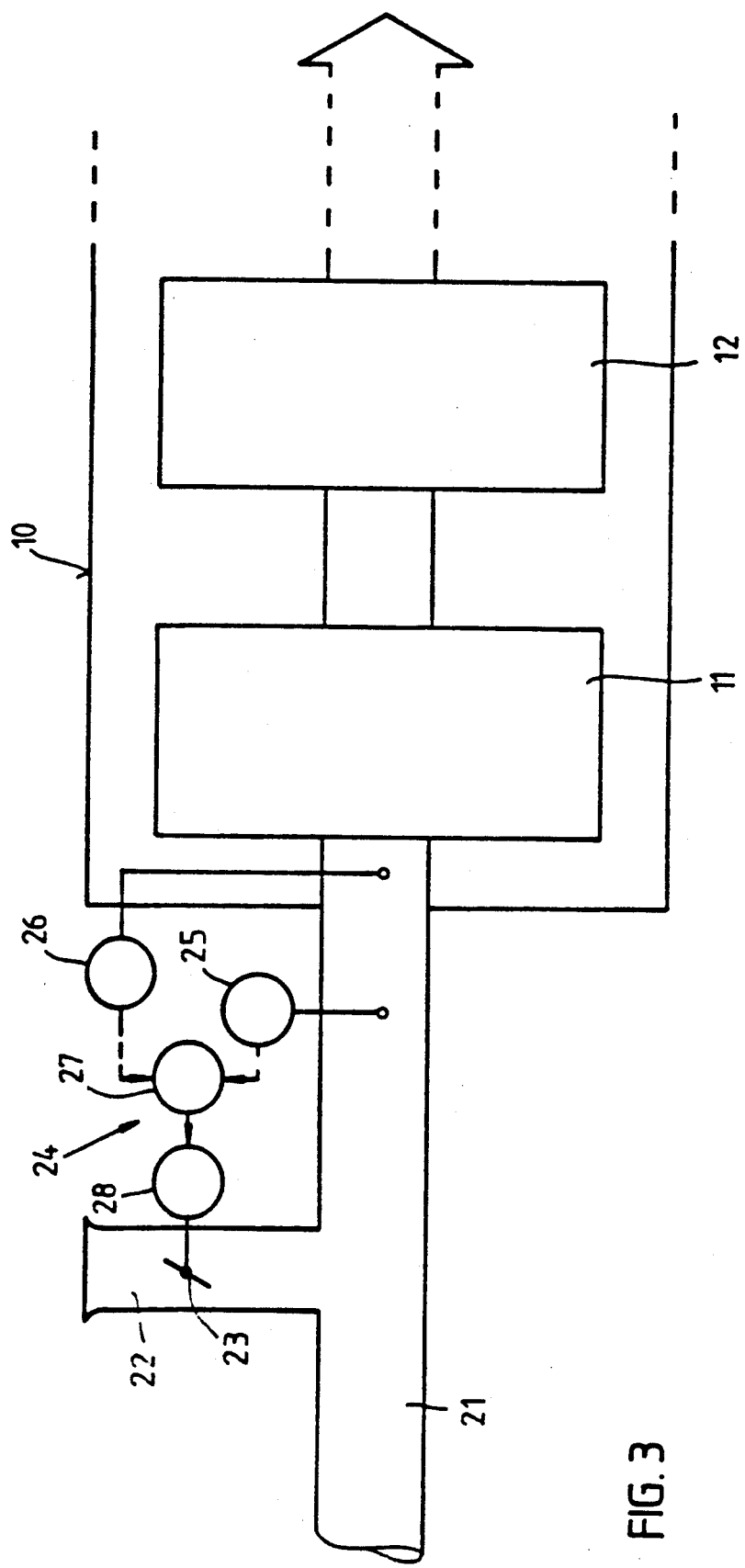

FIG. 3 shows that the duct 21 connecting the electrostatic filter 9 to the filter 10 can be provided with a fresh air connection 22 in which a regulating valve 23 is arranged.

This regulating valve 23 is set by means of a control arrangement 24 which contains inter alia a temperature gauge 25 and in this example also contains a gauge 26 which serves for determining the water content of the exhaust gases. From the two measured values and additional marginal data a computer 27 determines the necessary quantity of fresh air which is set by means of an actuating device 28 and the adjusting valve 23.

We claim:

1. A method of purifying exhaust gases from cement clinker production plants containing $NH_x$ and $NO_x$ compounds in which raw materials are first heated in a preheating zone with hot exhaust gases from a final burning zone and then burnt in the final burning zone to produce cement clinker, said method comprising:

adsorbing $NH_x$ compounds by passing exhaust gases from the preheating zone through a filter having an adsorption stage containing an adsorbent capable of adsorbing $NH_x$ compounds; and periodically delivering at least a portion of used $NH_x$-containing adsorbent from said adsorption stage into at least one of said zones thereby releasing the $NH_x$ compounds contained in the adsorbent for reaction with the exhaust gases and reducing a portion of the $NO_x$ compounds present in such exhaust gases prior to passing such gases to said adsorption stage.

2. A method according to claim 1 including at least one additional adsorption stage through which gas from the first mentioned adsorption stage is passed.

3. A method according to claim 2 including adding a gas containing $NH_3$ to said exhaust gases between the first and said additional adsorption stages.

4. A method according to claim 1 wherein said adsorption comprises carbonaceous material.

5. A method according to claim 1 wherein said adsorbent comprises zeolite.

6. A method according to claim 1 wherein said adsorbent comprises a lime-nitrogen compound.

7. A method according to claim 1 including filtering the exhaust gases upstream from said filter for precipitating dust present in the exhaust gases.

8. A method according to claim 7 wherein said exhaust gases contain vaporisable compounds including mercury, thallium, and cadmium which have a tendency to condense on the precipitated dust, said method including periodically withdrawing at least a portion of precipitated dust to avoid accumulations of such compounds in the system.

9. A method according to claim 1 including at least one additional adsorbent stage through which gases from the firstmentioned adsorbent stage is passed, and removing another portion of the used absorbent from the first absorption stage and delivering it to the second adsorbent stage.

10. A method according to claim 9 wherein said filter is provided with two adsorbent chambers arranged in series and through which the exhaust gases flow in succession, and wherein the adsorbent delivered to said additional adsorbent stage is obtained from the first adsorbent stage.

11. A method according to claim 1 including analyzing the raw materials between the preheating zone and the final burning zone to determine the presence and content of $Cl_2$ and $SO_3$ in the raw materials and thereby the necessity of removing a quantity of used adsorbent from the adsorption stage to avoid excessive accumulations of $Cl_2$ and $SO_3$ in the system.

12. A method according to claim 1 including measuring at least one of the exhaust gas constituents downstream from the adsorption stage for determining the quantity of used adsorbent to be removed from the first adsorption stage.

13. A method according to claim 1 including supplying fresh air to the exhaust gases upstream from the adsorption stage for adjusting the water content of the exhaust gases to a value of below about 12% by volume.

14. A method according to claim 1 including supplying fresh air to the exhaust gases upstream from the adsorption stage for adjusting the temperature of the exhaust gases to within a range of 50° to 200° C.

15. A method according to claim 1 wherein the final burning zone is provided with a material inlet side and a material discharge side and in which the final burning zone is heated from the material inlet side, said method including introducing the portion of used adsorbent into the material discharge side of the final burning zone.

16. A method according to claim 1 wherein the final burning zone is provided with a material inlet side and a material discharge side and in which the final burning zone is heated from the material discharge side, said method including introducing the portion of used adsorbent and a carbonaceous reducing agent into the material inlet side of the final burning zone.

17. A method according to claim 1 wherein a calcination zone is provided between the preheating zone and the final burning zone, said method including introducing at least a portion of the said adsorbent removed from the adsorption stage into the calcination zone.

18. A method according to claim 1 including using a secondary fuel selected from a group consisting essentially of old tires, acid sludge, fuller's earth, fuel from refuse, gas from refuse tips, pyrolysis gas, solvent residues, PCB-contaminated used oil, sludge, wood chips, and fruit peelings as at least a portion of fuel for the production of said hot gases.

19. A method according to claim 18 including introducing the selected secondary fuel into at least one of said zones.

20. A method according to claim 19 wherein vaporisable heavy metal compounds including mercury, thallium, and cadmium are present in the exhaust gases, said method including periodically withdrawing at least a portion of the exhaust gases from the system to reduce accumulations of such compounds.

* * * * *

UNITED STATES PATENT AND TRADEMARK OFFICE
CERTIFICATE OF CORRECTION

PATENT NO.   : 5,219,544
DATED        : June 15, 1993
INVENTOR(S)  : Detlev Kupper, Ludger Brentrup, Wolfgang Rother It is certified that error appears in the above-identified patent and that said Letters Patent is hereby corrected as shown below:

Column 2, line 57, change "chamber" to -- chambers --.

Column 7, lines 18, 19 and 22, change "adsorbent" to -- adsorption --;   line 20, change "absorbent" to -- adsorbent --; lines 24, 27 and 28, change "adsorbent" to -- adsorption --.

Signed and Sealed this

Eleventh Day of January, 1994

Attest:

BRUCE LEHMAN

Attesting Officer     Commissioner of Patents and Trademarks